(12) United States Patent
Liu et al.

(10) Patent No.: US 11,787,109 B1
(45) Date of Patent: Oct. 17, 2023

(54) 3-D STRUCTURES HAVING HIGH TEMPERATURE STABILITY AND IMPROVED MICROPOROSITY

(71) Applicant: Government of the United States, as represented by the Secretary of the Air Force, Wright-Patterson AFB, OH (US)

(72) Inventors: Hsiang H. Liu, Santa Clara, CA (US); James O. Hardin, IV, Enon, OH (US); John D. Berrigan, Xenia, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 0 days.

(21) Appl. No.: 18/110,505

(22) Filed: Feb. 16, 2023

Related U.S. Application Data (62) Division of application No. 16/940,421, filed on Jul. 28, 2020, now Pat. No. 11,613,077.

(Continued)

(51) Int. Cl.
*B29C 64/165* (2017.01)
*B33Y 70/00* (2020.01)
(Continued)

(52) U.S. Cl.
CPC .......... *B29C 64/165* (2017.08); *B29C 64/209* (2017.08); *B33Y 10/00* (2014.12);
(Continued)

(58) Field of Classification Search
CPC ..... B29C 64/165; B29C 64/209; B33Y 10/00; B33Y 40/20; B33Y 70/00; B33Y 80/00;
(Continued)

(56) References Cited

U.S. PATENT DOCUMENTS

| 5,443,727 A | 8/1995 | Gagnon |
| 6,267,916 B1 | 7/2001 | Meyering et al. |

(Continued)

FOREIGN PATENT DOCUMENTS

CN 107936682 * 4/2018 ........... B29C 64/112

OTHER PUBLICATIONS

Rau, D. A.; Herzberger, J.; Long, T. E.; Williams, C. B.; Ultraviolet-Assisted Direct Ink Write to Additively Manufacture All-Aromatic Polyimides, ACS Appl. Mater. Interfaces 2018, 10, 34828-34833.

(Continued)

*Primary Examiner* — Nahida Sultana
(74) *Attorney, Agent, or Firm* — AFMCLO/JAZ; James F. McBride (57) ABSTRACT

The present invention relates to 3-D structures having high temperature stability and improved micro-porosity as well as processes of making and using same. The disclosed 3-D are advantageous because they have low densities and low permittivities. When compared to previous 3-D structures, the present structures maintain their low permittivities over a broader range of electromagnetic frequencies. Thus, when used in communication devices such as array antennas, can provided higher communication performance in high temperature environments.

7 Claims, 5 Drawing Sheets

Related U.S. Application Data (60) Provisional application No. 62/886,011, filed on Aug. 13, 2019.

(51) Int. Cl.
  *B33Y 40/20* (2020.01)
  *B33Y 10/00* (2015.01)
  *B33Y 80/00* (2015.01)
  *B29C 64/209* (2017.01)
  *B29K 81/00* (2006.01)
  *B29K 63/00* (2006.01)
  *B29K 79/00* (2006.01)
  *B29K 83/00* (2006.01)

(52) U.S. Cl.
  CPC .............. *B33Y 40/20* (2020.01); *B33Y 70/00* (2014.12); *B33Y 80/00* (2014.12); *B29K 2063/00* (2013.01); *B29K 2079/08* (2013.01); *B29K 2081/06* (2013.01); *B29K 2083/00* (2013.01); *B29K 2995/0017* (2013.01); *B29K 2995/0077* (2013.01)

(58) Field of Classification Search
  CPC ............ B29K 2063/00; B29K 2079/08; B29K 2081/06; B29K 2083/00; B29K 2995/0017; B29K 2995/0077
  See application file for complete search history.

(56) References Cited

U.S. PATENT DOCUMENTS

| | | | |
|---|---|---|---|
| 6,458,162 | B1 | 10/2002 | Koblish et al. |
| 2007/0029696 | A1* | 2/2007 | Kurematsu ............... F16H 7/18 |
| | | | 264/172.19 |
| 2011/0059310 | A1 | 3/2011 | Wehrspohn et al. |
| 2015/0231572 | A1 | 8/2015 | Vankelecom et al. |
| 2020/0024465 | A1* | 1/2020 | Dylla-Spears ........... C09D 1/00 |
| 2020/0198251 | A1* | 6/2020 | Huang ...................... C08K 3/36 |
| 2023/0191487 | A1* | 6/2023 | Mika ........................ C22C 1/11 |
| | | | 148/538 |

OTHER PUBLICATIONS

Hegde, M.; Meenakshisundaram, V.; Chartrain, N.; Sekhar, S.; Tafti, D.; Williams, C. B.; Long, T. E.; 3D Printing All-Aromatic Polyimides using Mask-Projection Stereolithography: Processing the Nonprocessable, Adv. Mater. 2017, 29, 1701240, 1-7.

Herzberger, J.; Meenakshisundaram, V.; Williams, C. B.; Long, T. E.; 3D Printing All-Aromatic Polyimides Using Stereolithographic 3D Printing of Polyamic Acid Salts, ACS Macro Lett. 2018, 7, 493-497.

Product Description Sheet for Dupont™ KA701 Polyimide Encapsulant/Dielectric, 2016.

Product Description Sheet for Dupont™ Kapton™ KA801 Polyimide Silver Conductor, 2014.

Liu, H.C.; Hardin, J. O.; Berrigan, J. D.; Poster—Direct Ink Writing of Polyimide Architectures with Low Density and Low Dielectric Permittivity, 2018.

Unpublished U.S. Appl. No. 16/940,421.

* cited by examiner

3-D STRUCTURES HAVING HIGH TEMPERATURE STABILITY AND IMPROVED MICROPOROSITY

CROSS-REFERENCE TO RELATED APPLICATION

The present application is a divisional of and claims priority to U.S. patent application Ser. No. 16/940,421 filed Jul. 28, 2020, which in turn claims priority to U.S. Provisional Application Ser. No. 62/886,011 filed Aug. 13, 2019, the contents of both such priority documents hereby being incorporated by reference in their entry.

RIGHTS OF THE GOVERNMENT

The invention described herein may be manufactured and used by or for the Government of the United States for all governmental purposes without the payment of any royalty.

FIELD OF THE INVENTION

The present invention relates to 3-D structures having high temperature stability and improved micro-porosity as well as processes of making and using same.

BACKGROUND OF THE INVENTION

3-D printed structures are used for a number of purposes, including but not limited to high temperature communication applications. Unfortunately, current 3-D structures, including 3-D printed structures, do not offer the combination of high temperature stability and low permittivities over a broader range of electromagnetic frequencies that is desired for use in high temperature application communication devices.

Applicants recognized that the source of the aforementioned problem lie in the lack of micro-porosity found in 3-D structures made from high temperature polymers such as polyimides. Applicants solved such problem by creating a method for making a 3-D structure wherein tuneable microporosities can be obtained as a result of the judicious selection of the 3-D printing ink and the processing conditions under which such ink is 3-D printed. While not being bound by theory, Applicants believe that when a proper level of intrinsic micro-porosity is processed into a 3-D article, the air in the 3-D structure's micro-pores acts as a dielectric modifier. Thus, low permittivities over a broader range of electromagnetic frequencies can be obtained from the 3-D structure.

SUMMARY OF THE INVENTION

The present invention relates to 3-D structures having high temperature stability and improved micro-porosity as well as processes of making and using same. The disclosed 3-D structures are advantageous because they have low densities and low permittivities. When compared to previous 3-D structures, the present structures maintain their low permittivities over a broader range of electromagnetic frequencies. Thus, when used in communication devices such as array antennas, can provided higher communication performance in high temperature environments.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Definitions

As used herein a "three dimensional article" is defined as an article having a geometric structure that cannot be defined by a fixed distance projection of a two-dimensional pattern perpendicular to the surface containing the pattern and/or where the 3 major dimensions of the smallest rectangular prism bounding the article are such that the smallest dimension is larger than 10% of the next largest dimension which is larger than 10% of the largest dimension.

As used herein, the term miscible means forming at at least one temperature and pressure range combination, over the range of 15° C. to 60° C. and pressure range of 0.0001 atm to 2 atm, a homogenous solution without active demixing or phase separating behavior.

Unless specifically stated otherwise, as used herein, the terms "a", "an" and "the" mean "at least one".

As used herein, the terms "include", "includes" and "including" are meant to be non-limiting.

Unless otherwise noted, all component or composition levels are in reference to the active portion of that component or composition, and are exclusive of impurities, for example, residual solvents or by-products, which may be present in commercially available sources of such components or compositions.

All percentages and ratios are calculated by weight unless otherwise indicated. All percentages and ratios are calculated based on the total composition unless otherwise indicated.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Inks and 3-D Articles

For purposes of this specification, headings are not considered paragraphs and thus this paragraph is Paragraph twenty-three of the present specification. The individual number of each paragraph above and below this Paragraph can be determined by reference to this paragraph's number. In this paragraph twenty-three, Applicants disclose an article, said article being three dimensional and having at least two different scales of porosity, said article comprising a polymer, said polymer being a solid at 25° C. and having a degradation temperature of at least 200° C., preferably a degradation temperature from about 200° C. to about 520° C., preferably a degradation temperature from about 250° C. to about 520° C., more preferably a degradation temperature from about 300° C. to about 520° C., most preferably a degradation temperature from about 350° C. to about 520° C., each of said two difference scales of porosity scales being independently selected from macro-porosity, meso-porosity, and micro-porosity. The micro-porosity, or micro-scale porosity, should be defined herein as void with a cross-sectional area of 0.05 $\mu m^2$ to 1 $\mu m^2$. The meso-porosity, should be defined herein as void with a cross-sectional area greater than 1 $\mu m^2$ to 25 $\mu m^2$. The macro-porosity is defined herein as void with a cross-sectional area greater than 25 $\mu m^2$.

Applicants disclose an article according to paragraph twenty-three wherein said polymer comprises a material selected from the group consisting of imide, polysiloxane, epoxide, sulfone, fluoropolymer and mixtures thereof, preferably said imide is a polyimide, said polysiloxane is polydimethylsiloxane, said epoxide is a polyepoxide, said sulfone is a polysulfone and said fluoropolymer comprises tetrafluoroethylene, more preferably said fluoropolymer is a polytetrafluoroethylene.

Applicants disclose an article according to paragraphs twenty-three through twenty-four, said article being selected from the group consisting of cylinder, pipe, prism, ring, drum, sphere, ellipsoid, cone, pyramid, polyhedron, and cellular structure.

Applicants disclose an article according to paragraph twenty-three said article being selected from the group consisting of a cylinder, a pipe, a prism, a ring, a drum, a sphere, an ellipsoid, a cone, a pyramid, a polyhedron, a cellular structure and combinations thereof wherein said:
 a) cylinder is a structure that has the same cross-section from one end throughout the other end, while both ends should be identical, flat and parallel to each other, and having a contour of circle or oval.
 b) pipe is a structure that has the same cross-section from one end throughout the other end, while both ends should be identical, flat and parallel to each other, and having a contour of annulus.
 c) prism is a structure that has the same cross-section from one end throughout the other end, while both ends should be identical, flat and parallel to each other, and having a contour of any polygons.
 d) ring is a structure that, tracing from an outline of circle or any polygons, is having a cross-sectional area at any portion of the outline.
 e) drum is an internally hollow structure has the same cross-section on one end and on the other end, while both ends should be identical, flat and parallel to each other, and having a contour of circle or oval.
 f) sphere is a structure which surface is defined by a set of points that are all at the same distance three-dimensionally from a given point.
 g) ellipsoid is a structure that consisting a surface that can be obtained from a sphere described above, by deforming it by means of directional scaling or by affine transformation.
 h) cone is a structure with a three-dimensional geometric shape that tapers from a flat base, with any shapes or contour, to an apex point.
 i) pyramid is a structure that, with outer surfaces in triangular shape, with the number of the triangular outer surfaces depending on the number of lines that constituted a flat polygonal base, connect and converge to the point at a distance above the flat base.
 j) polyhedron is a structure that consisted of flat polygonal faces connected at all straight edges that three-dimensionally enclosing a space.
 k) cellular structure is a structure that is built with a number of repeated base unit, said a cell or lattice, with same contour or geometrical shape in any scaling.

Applicants disclose an article according to paragraphs twenty-three through twenty-six, said article a three-dimensional porous carbon structure, preferably said article is carbonized by heat treatment.

Applicants disclose an ink comprising, based on total ink weight:
 a) from about 25% to about 50%, preferably, from about 30% to about 45%; more preferably from about 35% to about 45%; most preferably from about 38% to about 45% of a polymer, said polymer being a solid at 25° C. and having a degradation temperature of at least 200° C., preferably a degradation temperature from about 200° C. to about 520° C., preferably a degradation temperature from about 250° C. to about 520° C., more preferably a degradation temperature from about 300° C. to about 520° C., most preferably a degradation temperature from about 350° C. to about 520° C., preferably said polymer comprises a material selected from the group consisting of imide, polysiloxane, epoxide, sulfone, fluoropolymer and mixtures thereof, preferably said imide is a polyimide, said polysiloxane is polydimethylsiloxane, said epoxide is a polyepoxide, said sulfone is a polysulfone and said fluoropolymer comprises tetrafluoroethylene, more preferably said fluoropolymer is a polytetrafluoroethylene.
 b) from about 50% to about 75%, preferably, from about 50% to about 70%; more preferably from about 50% to about 65%; most preferably from about 50% to about 60% of a solvent, said solvent having a solubility of at least of 0.1 g polymer/mL of said solvent, preferably said solvent being selected from the group consisting of oxygenated solvents, hydrocarbon solvents, or halogenated solvents and mixtures thereof,
 c) from about 0.3% to about 12%, preferably, from about 0.3% to about 10%; more preferably from about 0.5% to about 10%; most preferably from about 0.5% to about 8% of a non-solvent, said non-solvent having a solubility of no more than 0.001 g polymer/mL of said non-solvent, which should be defined as the maximum mass amount of polymer in gram that can be dissolved by one milliliter (mL) of solvent herein, should be no more than 0.001 g/mL, preferably said non-solvent being selected from the group consisting of oxygenated solvents and hydrocarbon solvents and mixtures thereof.

Applicants disclose an ink according to paragraph twenty-eight, wherein said non-solvent comprises water.

Applicants disclose an ink according to paragraph twenty-eight, wherein the solvent and/or non-solvent are miscible and are anhygroscopic; preferably the solvent and non-solvent are anhygroscopic. When the solvent and/or non-solvent are anhygroscopic the ink can be extruded through a nozzle onto a substrate, with a custom capability to track ink density with respect to change in ink rheological behavior and to recalibrate speed or dimension during printing, to form single-layer or multiple-layer structures, under a relative humidity level lower than 10%.

Applicants disclose an ink according to paragraphs twenty-eight through thirty comprising a particle having a size range of from about 5 nm to about 3 μm; preferably from about 50 nm to about 1 μm; more preferably from about 50 nm to about 250 nm; most preferably from about 50 nm to about 200 nm; preferably said particles comprise a material selected from the group consisting of fumed silica, glass bubbles, polyhedral oligomeric silsesquioxane and mixtures thereof. Such particles enhance the overall porosity, reduce the density and relative permittivity of Applicants' three dimensional articles.

Process of Making an Ink and Making an Article

Applicants disclose a process of making the ink of paragraphs twenty-eight through thirty-one, said process comprising combining:
  a) a polymeric material;
  b) a solvent, said solvent having a boiling temperature $T_a$
  c) a non-solvent said non-solvent having a boiling temperature $T_b$, said $T_b$ being at least 40° C. higher than $T_a$, preferably about 50° C. higher than $T_a$, more preferably about 60° C. higher than $T_a$, most preferably more than 70° C. higher than $T_a$; said solvent and non-solvent being miscible; and
  d) optionally particles having a size range of from about 5 nm to about 3 μm; preferably from about 50 nm to about 1 μm; more preferably from about 50 nm to about 250 nm; most preferably from about 50 nm to about 200 nm; preferably said particles comprise a material selected from the group consisting of fumed silica, glass bubbles, polyhedral oligomeric silsesquioxane and mixtures thereof.

Applicants disclose a process of making an article, said process comprising extruding the ink according to paragraphs twenty-eight through thirty-one, said ink comprising a solvent having a boiling temperature $T_a$ and a non-solvent having a boiling point $T_b$ that is higher than said $T_a$, said $T_b$ being at least 40° C. higher than $T_a$, preferably about 50° C. higher than $T_a$, more preferably about 60° C. higher than $T_a$, most preferably more than 70° C. higher than $T_a$, through a nozzle onto a substrate at a relative humidity level of at least 10%, preferably at a relative humidity level of from about 12% to 25%, more preferably at a relative humidity level of from about 15% to 22%, and at a temperature at least 15° C. lower than $T_a$, preferably 40° C. lower than said $T_a$, more preferably more than 70° C. lower than said $T_a$.

Applicants disclose a process of making an article according to paragraph thirty-three, said process comprising:
  a) placing said article in a bath, said bath comprising one or more non-solvents, preferably said non-solvents are selected from the group consisting of methanol, water, isopropyl alcohol and mixtures thereof; and/or maintaining the temperature and relative humidity conditions of paragraph thirty-three until the ink undergoes phase inversion, preferably said temperature and relative humidity conditions are maintained for about 12 hours to about 168 hours, more preferably for about 24 hours to about 72 hours, most preferably for about 36 hours to about 48 hours; preferably said article is placed in said bath before said temperature maintenance;
  b) optionally, heating and/or reducing the environmental pressure of said article to remove residual solvent, preferably at least 90% of said residual solvent is removed from said article, preferably said article is simultaneously heated and the environmental pressure of said article is reduced, preferably said heating is conducted such that the temperature is raised at a rate of 5° C./minute to reach a temperature that is at least 15° C. below the solvent's $T_a$. Step a) is conducted to promote additional porosity in said article while Step b) is conducted to increase said article's mechanical rigidity. The article's environmental pressure can be reduced by placing said article under a vacuum. The rate and degree of vacuum should be controlled to avoid deforming said article.

Applicants disclose a process of making an article according to paragraph thirty-four, said process comprising removing said non-solvent by heating and/or reducing the environmental pressure of said article, said heating comprising heating said article to a temperature at least 20° C. lower than Tb, preferably 35° C. lower than Tb, more preferably about 50° C. lower than Tb. The article's environmental pressure can be reduced by placing said article under a vacuum. The rate and degree of vacuum should be controlled to avoid deforming said article.

Applicants disclose a process of making an article according to paragraph thirty-four, said process comprising removing said non-solvent by placing said article in an extraction bath, said extraction bath comprising a material that comprises one or more liquids that said article is not soluble in but which the non-solvent is soluble in; preferably said material should be heated to a temperature that is plus or minus 10° C. of the lowest boiling point of said one or more liquids.

Test Methods

Figure 1:
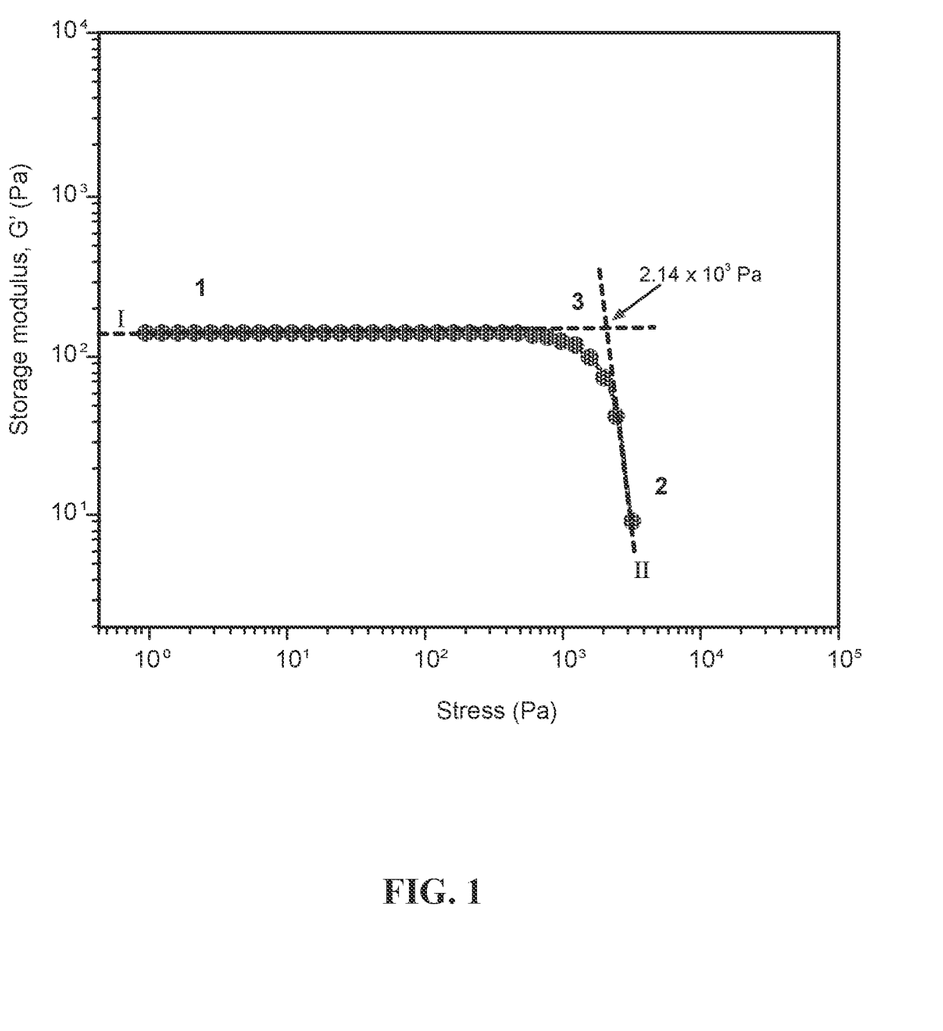
FIG. 1 is a plot displaying sample yield stress determination principle for inks.

Ink rheology measurement: Ink rheology is reported as ink viscosity in Pa-s and ink yield stress in Pa. Rheological measurement (e.g., viscosity, yield stresses) of the 3D printing inks should be performed on a Discovery Hybrid Rheometer (TA Instruments) with test temperature controlled at 25° C. by a Peltier plate. All measurements should be done using a parallel-plate geometry with a diameter of 25 mm and a gap size of 1 mm between the top and bottom plate. When loading the ink samples for rheological measurement, a thin layer of silicone oil must be applied to cover the exposed surface of ink samples between the plates to prevent moisture adsorption and solvent evaporation during measurements. The silicone oil is a liquid polymerized siloxane with molecular formula $[-Si(CH_3)_2O-]_n$ and a viscosity of 100 mPa·s, purchased from Sigma-Aldrich (now part of MilliporeSigma) with the product identification number of 85409. Steady shear (in a range of 0.01 s$^{-1}$ to 100 s$^{-1}$) tests should be performed under a strain of 0.5% to measure ink viscosities, and oscillatory stress (1 Pa to 50,000 Pa) tests should be performed under a frequency of 1 Hz to measure ink yield stresses. Zero-shear viscosity value of ink samples is determined using the ink viscosity value at 0.01 s$^{-1}$. Yield stress of ink samples should be determined from a plot of measured storage moduli (G') of inks as a function of oscillation stress. A representative plot for yield stress determination should have measured ink storage modulus values plotted in the y-axis and have the corresponding oscillatory stress plotted in the x-axis, with both axes rendered in logarithmic scale as in FIG. 1 wherein: initial linear storage modulus (G') 1; linear slope after the non-linear deflection of storage modulus values 2 and the intersection of extrapolation (I) and (II) 3 is shown. The oscillatory stress value, indicated by the x-axis of the plot, should be determined as the yield stress of sample ink. Such plot should be referred as the yield stress determination plot herein. The yield stress should be determined as the oscillatory stresses representing the onset point of non-linear initial drop of storage modulus (G') of ink samples from the yield stress determination plot. To determine the onset point of non-linear initial drop of storage modulus in the yield stress determination plot, an extrapolation (I) obtained from the initial 50% of the linear G' values before the non-linear deflection should be taken and another extrapolation (II) based on the last 50% of the linear portion of the G' slope after non-linear deflection should also be taken. The onset point should then be determined by the intersection of extrapolation I and II, by which the corresponding oscillatory stress value of that point should be defined as the yield stress value of the corresponding ink.

Density measurement: Density is reported as g/cm$^3$. Density values of printed structures were determined following ASTM D-792 method at a temperature of 19° C. and using hexane as the immersion liquid. Porosity values were calculated from the measured densities, where $$\text{porosity value (\%)} = \left(1 - \frac{\text{measured density}}{\text{bulk material density}}\right) \times 100\%$$

The bulk material density in this case should be the density of the structural starting material of the printed structures, as reported by the manufacturer.

Figure 2:
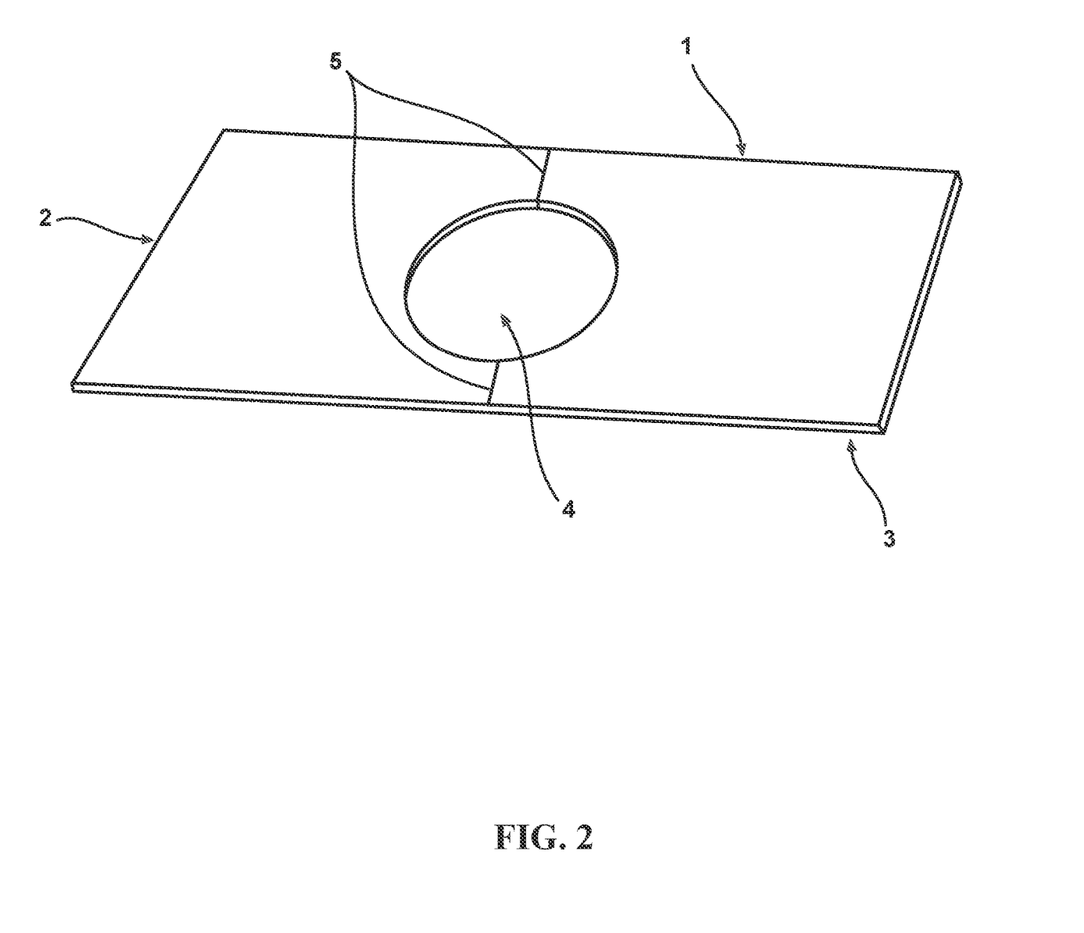
FIG. 2. is a plot displaying paper loading frame for samples of tensile properties measurement.
Figure 3:
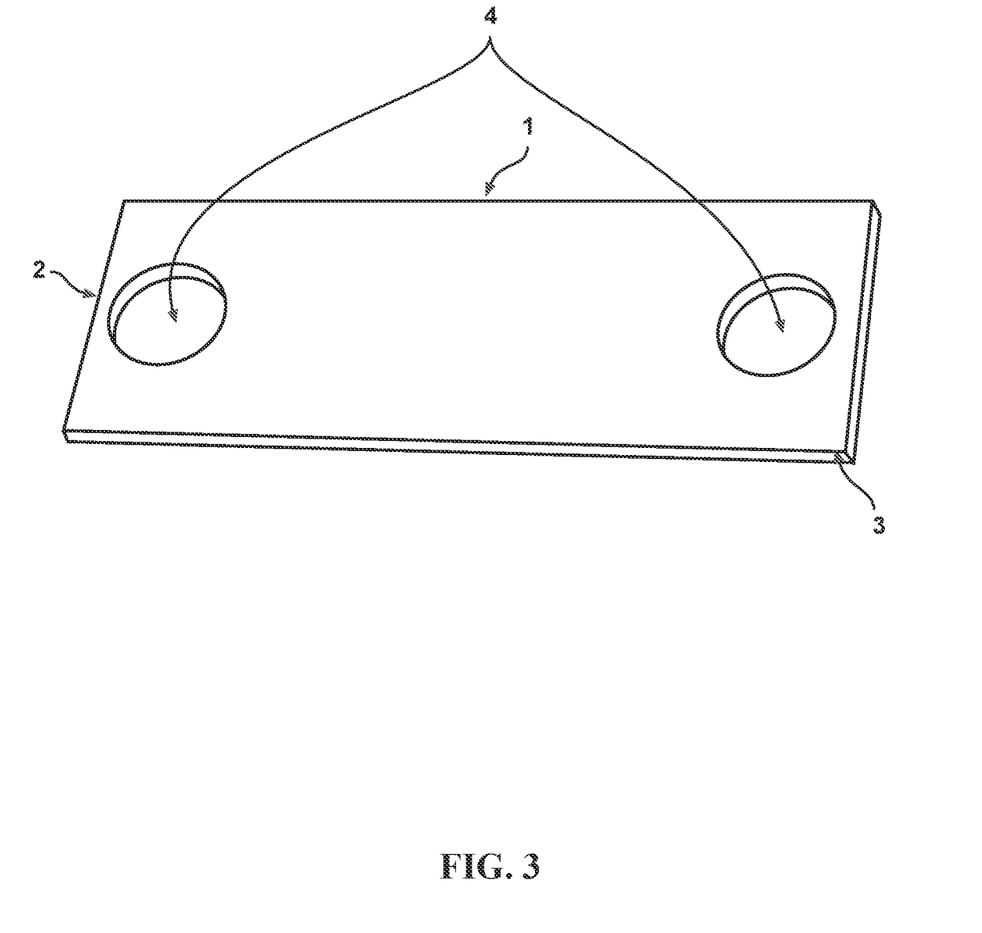
FIG. 3. is a plot displaying a customized shim for tensile properties measurement.

Tensile properties measurement: Tensile properties are reported as specific tensile strength MPa/density and as specific modulus GPa/density. Tensile strength and modulus of the printed materials should be done on filamentary samples at a temperature of 25° C. based on the slight modification of methods described by ASTM D3822 as detailed below. Printed filamentary samples should be characterized by RSA III solid analyzer (TA Instruments) with a testing gauge length of 10 mm and a strain rate of 1%/s used for all samples and trials. The filamentary samples to be measured should be mounted onto a paper loading frame FIG. 2. with a length 1, width 2, and thickness 3 being 25.4±2 mm, 10±2 mm, and 0.3±0.1 mm, respectively. Each paper loading frame should have a circular hole 4 with a diameter of 6.4±0.1 mm, locating in the center of paper loading frame and cut-off portion 5. The center should be defined as the intersection of the midpoints of length and width of the paper loading frame. During sample preparation for tensile property measurement, the subject filamentary sample should have a length of 30 mm and should be adhered onto a paper loading frame using a section of 3M 33+ Electrical Tape (with a length of 8±2 mm and a width of 5±1 mm) applied at each end of the filamentary sample to affix filamentary sample to the paper loading frame. During the sample loading step, the sample along with the attached loading frame should be loaded by the fiber/film tensile testing clamps of by RSA III solid analyzer. A customized shim (FIG. 3) having 1 a shim length of 21.70±0.5 mm; 2 a shim width of 7.85±0.5 mm; a shim thickness of 0.8±0.5 mm; a pair of circular holes 4 for screw fitting each having a diameter of 3.45±0.25 mm made of RGD8730-DM by Stratasys and is fabricated by a Connex3 Object 260 printer using RGD8730-DM. Such shim should be placed between each contact surface between the sample-attached paper loading frame and the clamps of RSA III solid analyzer. The sample-attached paper loading frame should be then positioned and affixed by the RSA testing clamps at designated gauge length, using a torque wrench at a torque of 12 cN·m. Before tensile property measurement, the paper loading frame should be cut across the circular hole (FIG. 2) to avoid biased measurement from the paper loading frame. Each tensile test sample, should break in the region at the mid-point or ±12.5% of the total sample length from the mid-point, if tensile properties measurement are performed properly. At such point, the tensile strength in MPa and the modulus in GPa is the tensile strength in MPa and the modulus in GPa for purposes of the present application. Such properties and the measured density of the sample is then used to calculate specific tensile strength MPa/density and specific modulus GPa/density.

Dielectric properties measurement: Dielectric properties are reposted as relative permittivity and dissipation factor of the printed materials should be measured at a temperature of 25° C. following the parallel plate method or the three terminal method in ASTM D150. The measurements involved sandwiching printed two-layer log-pile structures (with a thickness of ~0.8 mm) using an E4991B impedance analyzer and Keysight 16453A Dielectric Material Test Fixture (Keysight Technologies) at a frequency range of 100 MHz to 1 GHz.

Figure 4:
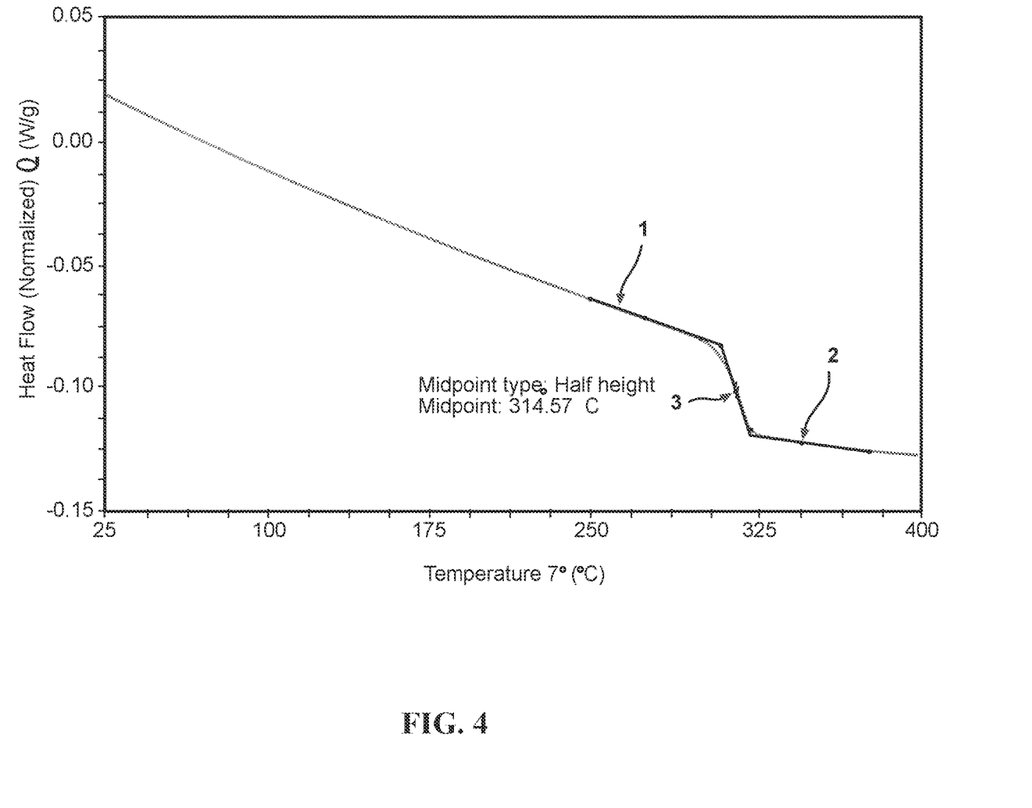
FIG. 4. is a plot displaying sample glass transition temperature (Tg) of printed materials.

Thermal properties measurement: Thermal properties are reported as glass transition temperature (Tg) and thermal degradation temperature (Td) in degrees Celsius (° C.). The Tg of the printed materials should be measured following methods described in ASTM D3418-15 with slight modifications as provided below. Differential scanning calorimetry (DSC, Discovery 2500 by TA Instruments) was performed on the printed materials to evaluate material Tg. 1.5 mg of printed material, should be chopped into sections having a the long axis a length of 1 mm to 2 mm to form a thin mat loaded in aluminum testing specimens for test sample preparation. A fast heating scan from 0° C. to 400° C. at a rate of 30° C./min should be applied to the samples in nitrogen with subsequent quenching from 400° C. to −20° C. at the same cooling rate. The Tg should be determined from the subsequent heating scan, said the representative scan, in nitrogen from 0° C. to 400° C. at a rate of 10° C./min. Determination of Tg of the curve from the representative scan was obtained through the software TA Instruments Trios v4.3.1.39215. For Tg analysis, the representative scan should be loaded by the Trios software to render a plot with temperature ranging between 25° C. to 400° C. plotted in x-axis and the corresponding normalized sample heat flow, with a unit of W/g, plotted in y-axis as in FIG. 4 showing start of first linear portion used for Tg determination 1; end of second linear portion used for Tg determination 2 and Tg value determined by the software 3, read as Midpoint in the software-generated plot.

The rendered curve should have exothermic heat flow directed in the positively increasing y-axis direction and the endothermic heat flow directed in the negatively increasing y-axis direction, and the rendered curve should span through at least 60% of the y-axis scale. Along the rendered curve, in the direction of increasing temperature from 25° C., a deflection of curve slope towards endothermic heat flow direction should be observed, followed by another deflection of curve slope at higher temperature. Through the Trios software, select a portion of the curve that covers from the linear portion of the curve at about 25° C. to 56° C. before the initiation of first slope deflection and until the linear portion at about 25° C. to 56° C. after the second slope deflection. The Tg of the curve should be obtained by selecting "Glass transition" from the "Analyze" option of the selected curve. Thermal stability of the printed materials should be characterized following methods described in ASTM E2250-17, with the thermal gravimetric analysis (TGA, Q500 by TA Instruments) performed on the printed filaments to determined materials degradation over heat treatment from 30° C. to 900° C. at a heating rate of 10° C./min under gas nitrogen having the a purity level 99.99%. The Td herein should be defined as the corresponding temperature at the 5 weight percent loss during the described thermal gravimetric analysis Cryofracturing of printed materials: To prepare for cryofracturing, 2 mg of printed material should be submerged in isopropyl alcohol ($CH_3CHOHCH_3$, with a purity level of 99.7% or higher) and capped in a 20 mL glass vial (VWR product catalog number: 66009-562) at 25° C. for over 12 hours before further use. During cryofacturing, the printed materials should be removed from the isopropyl alcohol and immediately submerged in a liquid nitrogen bath that should be kept in a dewar. Duration of printed material immersion in liquid nitrogen should be for 15 minutes to ensure proper cryogenic state of printed materials. While submerged in the liquid nitrogen bath, should be cut by a single-edge razor blade with a blade thickness equal to or less than 0.009 inch. With proper cryofracturing, sample cross sections, when being examined by a scanning electron microscope, should display any crushing or distortion of the cross-sectional pores nor should they display deformation of the cross-sectional contour and integrity.

Void or pore size measurement: Measurement of void or pore sizes in the printed materials should be done on the cross sections with necessary post-printing treatments described in the Test Methods Section of this specification. Proper cross sections of printed materials should be confirmed by morphology analysis before used for pore size measurement. The proper cross sections described herein should be obtained from (1) the fractured surfaces from samples undergoing tensile test described in the tensile properties measurement or from (2) the cryofracturing of printed materials methods. From the proper cross sections, images of the sample cross section morphology should be taken in the orthogonal view direction to the targeted sample area, by a scanning electron microscope (ZEISS GeminiSEM 500) operated at an accelerating voltage of 2 kV with a working distance less than 4.5 mm and a magnification of 1000×. The collected morphology images should be imported to an image processing program ImageJ (v1.8.0) developed by the National Institute of Health. The procedure of pore size measurement should include: (1) import collected sample morphology images into ImageJ, (2) set the global scale of unit length to pixel in the software, (3) select and duplicate target area for pore size measurement, (4) adjust threshold of the duplicated image until pore contours are clearly shown and make sure pores are completely filled by threshold selection, (5) apply the selected threshold and use built-in "Analyze Particles" function to measure selected pores by setting the to capture pores openings to sizes between 0.05 µm² to 25 µm² and circularity between 0.05 to 1.00. This will return area measurement of pores captured by the program. (6) Import the pore area measurements to a spreadsheet in Microsoft Excel program and convert the measured area values to corresponding diameters of circular pores, using the following equation. The calculated diameters were reported as pore size with a unit in µm.

$$\text{pore size } (\mu m) = 2 \times \sqrt{\frac{\text{measured individual porous area } (\mu m^2)}{\pi}}$$

$$= \text{correspondoing diameter of a circulcar pore } (\mu m)$$

Examples

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

Example 1—Development and formulation of 3D printable phase-inversion inks containing polyimide and miscible good and poor solvent. To a 20 mL glass vial (VWR product catalog number: 66009-562) was added 11 gram of N,N-Dimethylformamide and 1 gram of polyethylene glycol (with molecular weight ~400 g/mol). The mixture was then capped and mixed via a vortex mixer for 15 minutes. To a separate 300-mL container was added 9 gram of polyimide solid Matrimid® 5218, then was added the previous mixture of N,N-Dimethylformamide and polyethylene glycol. The ternary mixture capped, and was then mixed using a planetary centrifugal mixer at a speed of 2,000 rpm for 2 minute per session, with a total of 6 sessions. After mixing from the planetary centrifugal mixer, the container was then transferred onto a roller mixer kept at a speed of 50 rpm until complete dissolution of the solids. The product formed after complete dissolution was then referred as the ink. Throughout the whole preparation process in Example 1, all steps were done under an ambient temperature of 25° C.

Example 2—Extrusion and 3D printing of phase-inversion inks. To prepare for printing and ink extrusion, the ink was loaded into a syringe equipped with a nozzle with a typical diameter size of 250 or 580 µm. The syringe assembly, loaded with printing ink, was then be placed into a Nordson EFD HPx high-pressure dispenser attached to a three-axis gantry system. During printing, desired toolpath for the gantry system was loaded through a controlling program or computer to move the gantry system to designated spaces, and a proper pressure was applied to the syringe through the high-pressure dispenser to extrude ink onto target substrate. The appropriate level of pressure to extrude the inks depends on the ink rheological behavior and nozzle size. If a tapered nozzle with an inner diameter of 250 µm was used, an appropriate pressure level to extrude would be ~420 kPa for the ink described in Example 1. If a tapered nozzle with an inner diameter of 580 μm was used, an appropriate pressure level to extrude the ink described in Example 1 would be ~300 kPa. A relative humidity level of 18% was found appropriate for 3D printing condition of the ink in Example 1 to undergo phase inversion while being printed into desired 3D structures. To prevent ink phase inversion and avoid generation of intrinsic porosity of the printed structures, a suppressed relative humidity level of 5% (with <5% tolerance) can be used during 3D printing process. Throughout the whole preparation process in Example 2, all steps were done under an ambient temperature of 25° C.

Example 3—Post-print phase inversion process. Printed structures from Example 2 could be kept in ambient condition or placed in a bath to promote post-print phase inversion of the inks. For bath phase-inversion process, printed structures were placed in a 150-mL bath mixed with water and methanol in a respective 92 to 8 percent ratio by weight. The water/methanol bath, acts as poor solvents for polyimide that exchange with the residual ink solvent in the printed structure, can promote phase inversion process to increase resultant porosity of the printed structures. During the post-print phase inversion process, in ambient or bath conditions, the printed structures were completely solidified. Throughout the whole preparation process in Example 3, all steps were done under an ambient temperature of 25° C.

Example 4—Residual ink solvents extraction process. A further ink solvent extraction process was done by placing printed structures in a 300-mL bath mixed with water and methanol in a respective 44 to 55 percent ratio by weight, maintained at 60° C. for over 12 hours. A total of 6 baths were applied to the printed structures to completely remove the ink solvents (N,N-Dimethylformamide and polyethylene glycol) described in Example 1. Alternatively, solvent extraction process can also be done by treating printed structures in an oven with a temperature maintained above boiling points of ink comprising solvents under vacuum.

Example 5—Development and formulation of alternative 3D printable phase-inversion inks containing polyimide and miscible good and poor solvent. The procedure of Example 1 was used except the amount of polyethylene glycol (with molecular weight ~400 g/mol) was varied to be 0.1 or 0.5 gram to create gradient of the resulting porosity of the printed structures.

Example 6—Development and formulation of alternative 3D printable phase-inversion inks containing polyimide and miscible good and poor solvent. The procedure of Example 1 was used except the amount of Matrimid® 5218 was changed to 7.5 gram.

Example 7—Development and formulation of alternative 3D printable phase-inversion inks containing polyimide and miscible good and poor solvent. The procedure of Example 1 was used except N,N-Dimethylformamide and polyethylene glycol (with molecular weight ~400 g/mol) was replaced by N-Methyl-2-Pyrrolidone and glycerol, respectively.

Example 8—Development and formulation of alternative 3D printable phase-inversion inks containing polyimide and miscible good and poor solvent. The procedure of Example 1 was used except polyethylene glycol with a molecular weight of ~400 g/mol is replaced by polyethylene glycol with a molecular weight of ~200 g/mol or ~600 g/mol.

Figure 5A:
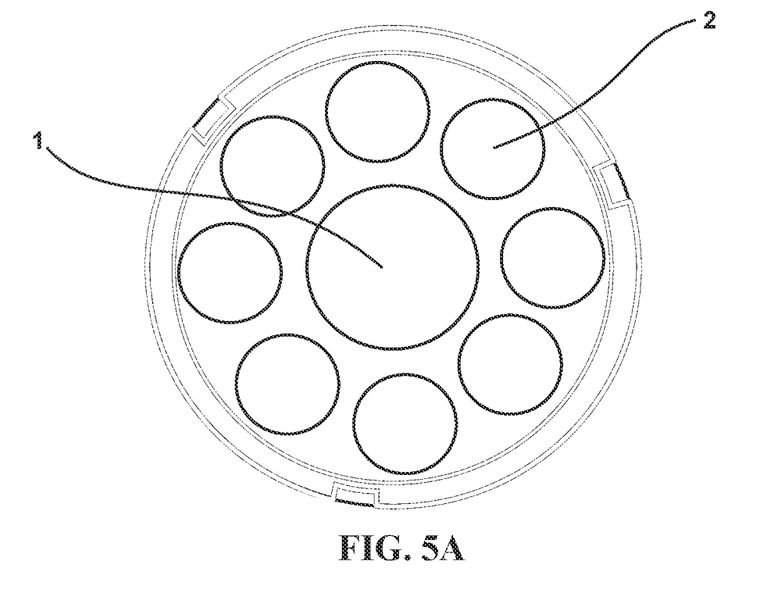
FIG. 5A. is a top view of a customized holder for 4-mL and 20-mL vial
Figure 5B:
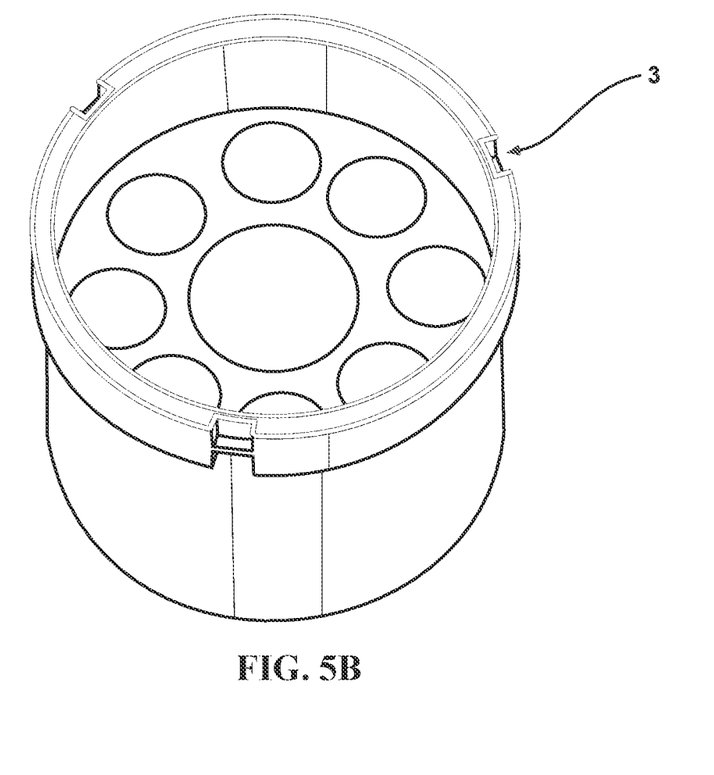
FIG. 5B is an isometric view of a customized holder for 4-mL and 20-mL vial

Example 9—Development and formulation of particles-loaded 3D printable phase-inversion inks containing polyimide and miscible good and poor solvent. To a 20 mL glass vial (VWR product catalog number: 66009-562) was added 11 gram of N,N-Dimethylformamide and 0.7 gram of 3M™ Glass Bubbles D32/4500. The mixture in 20-mL glass vial was sonicated while maintained in rotation at a speed of 30 rpm for two hours before subsequent addition of 1 gram of polyethylene glycol (with molecular weight ~400 g/mol). The mixture capped and was then further mixed using a planetary centrifugal mixer and a customized holder (FIG. 5A) having placement socket 1 for the 20-mL glass vial (VWR product catalog number: 66009-562) and a layer of polydimethylsiloxane, with a thickness of 1 mm, coated on the bottom surface of the socket; a placement socket 2 for the 4-mL glass vial (Thermo Fisher Scientific product catalog number: B7999-2) and a layer of polydimethylsiloxane, with a thickness of 1 mm, coated on the bottom surface of the socket; (FIG. 5A) having cleat wedge design 3 to provide fixture during mixing; and holder material is made of acrylonitrile butadiene styrene. The planetary centrifugal mixer and a customized holder (FIGS. 5A and 5B) is operated at a speed of 2,000 rpm for 2 minute per session, with a total of 2 sessions. To a separate 300-mL container was added 9 gram of polyimide solid Matrimid® 5218, then was added the aforementioned mixture of solvents and glass bubbles. The container capped, and was mixed using a planetary centrifugal mixer at a speed of 2,000 rpm for 2 minute per session, with a total of 6 sessions. After mixing from the planetary centrifugal mixer, the container was then transferred onto a roller mixer kept at a speed of 50 rpm until complete dissolution of the solids. The product formed after complete dissolution was then referred as the ink. Throughout the whole preparation process in Example 9, all steps were done under an ambient temperature of 25° C.

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A process of making an article, said process comprising extruding an ink, said ink comprising, based on total ink weight:
    a) from 25% to 50% of a polymer, said polymer being a solid at 25° C. and having a degradation temperature of at least 200° C., said polymer comprising a material selected from the group consisting of imide, polysiloxane, epoxide, sulfone, fluoropolymer and mixtures thereof;

b) from 50% to 75% of a solvent, said solvent having a solubility of at least of 0.1 g polymer/mL of said solvent;

c) from 0.3% to 12% of a non-solvent, said non-solvent having a solubility of no more than 0.001 g polymer/mL of said non-solvent said solvent having a boiling temperature $T_a$ and said non-solvent having a boiling point $T_b$ that is higher than said $T_a$, said $T_b$ being at least 40° C. higher than $T_a$, through a nozzle onto a substrate at a relative humidity level of at least 10%, and at a temperature at least 15° C. lower than said $T_a$.

2. The process of making an article according to claim 1, wherein said $T_b$ is at least 70° C. higher than $T_a$, said relative humidity level is from about 15% to 22%, and at a temperature at least 15° C. lower than said $T_a$, and said extrusion temperature is at a temperature more than 70° C. lower than said $T_a$.

3. The process according to claim 1 comprising:

a) placing said article in a bath, said bath comprising one or more non-solvents and/or maintaining the temperature and relative humidity conditions of claim 1 until the ink undergoes phase inversion;

b) optionally, heating and/or reducing the environmental pressure of said article to remove residual solvent.

4. The process according to claim 3 wherein:

a) said non-solvents are selected from the group consisting of methanol, water, isopropyl alcohol and mixtures thereof; and said temperature and relative humidity conditions are maintained for about 36 hours to about 48 hours and said article is placed in said bath before said temperature maintenance; and b) comprising removing at least 90% of said residual solvent from said article by heating and/or reducing the environmental pressure of said article, said heating is conducted such that the temperature is raised at a rate of 5° C./minute to reach a temperature that is at least 15° C. below the solvent's $T_a$.

5. The process according to claim 3 comprising removing said non-solvent by heating and/or reducing the environmental pressure of said article, said heating comprising heating said article to a temperature at least 20° C. lower than $T_b$.

6. The process according to claim 3 comprising removing said non-solvent by placing said article in an extraction bath, said extraction bath comprising a material that comprises one or more liquids that said article is not soluble in but which the non-solvent is soluble in.

7. The process according to claim 3 wherein said non-solvents are selected from the group consisting of methanol, water, isopropyl alcohol and mixtures thereof.

* * * * *